US012670474B1

(12) United States Patent
Gupta et al.

(10) Patent No.: US 12,670,474 B1
(45) Date of Patent: Jun. 30, 2026

(54) SYSTEMS AND METHODS TO GENERATE RECORD RECOMMENDATIONS FOR USERS OF COLLABORATION ENVIRONMENT

(71) Applicant: Asana, Inc., San Francisco, CA (US)

(72) Inventors: Sarang Gupta, Vancouver (CA); Zhan Shi, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 217 days.

(21) Appl. No.: 18/357,619

(22) Filed: Jul. 24, 2023

(51) Int. Cl.
*G06Q 10/10* (2023.01)
*G06Q 10/0631* (2023.01)

(52) U.S. Cl.
CPC ..... *G06Q 10/103* (2013.01); *G06Q 10/06315* (2013.01)

(58) Field of Classification Search
None
See application file for complete search history.

(56) References Cited

U.S. PATENT DOCUMENTS

| | | | |
|---|---|---|---|
| 5,233,687 | A | 8/1993 | Henderson, Jr. |
| 5,524,077 | A | 6/1996 | Faaland |
| 5,530,861 | A | 6/1996 | Diamant |
| 5,608,898 | A | 3/1997 | Turpin |
| 5,611,076 | A | 3/1997 | Durflinger |
| 5,623,404 | A | 4/1997 | Collins |
| 5,721,770 | A | 2/1998 | Kohler |
| 5,983,277 | A | 11/1999 | Heile |
| 6,024,093 | A | 2/2000 | Cron |
| 6,256,651 | B1 | 7/2001 | Tuli |
| 6,292,830 | B1 | 9/2001 | Taylor |
| 6,332,147 | B1 | 12/2001 | Moran |
| 6,385,639 | B1 | 5/2002 | Togawa |
| 6,621,505 | B1 | 9/2003 | Beauchamp |
| 6,629,081 | B1 | 9/2003 | Cornelius |

(Continued)

FOREIGN PATENT DOCUMENTS

| | | |
|---|---|---|
| CN | 101305350 A | 11/2008 |
| CN | 101563671 A | 10/2009 |

(Continued)

OTHER PUBLICATIONS

Kroner, M. Schneider and J. Mori, "A Framework for Ubiquitous Content Sharing," in IEEE Pervasive Computing, vol. 8, No. 4, pp. 58-65, Oct.-Dec. 2009, doi: 10.1109/MPRV.2009.65 (Year: 2009).*

(Continued)

*Primary Examiner* — Laura Yesildag
(74) *Attorney, Agent, or Firm* — Esplin & Associates, PC

(57) ABSTRACT

Systems and methods to generate record recommendations for users of collaboration environment are described herein. Exemplary implementations may: manage environment state information maintaining the collaboration environment and including work unit records; determine interaction information characterizing interactions of individual users with individual ones of the work unit records; generate, for the individual users, record recommendations based on the interaction information for similar users; effectuate presentation of the record recommendations on computing platforms associated with the individual users; and/or perform other operations.

18 Claims, 3 Drawing Sheets

(56) References Cited

U.S. PATENT DOCUMENTS

| | | | |
|---|---|---|---|
| 6,769,013 B2 | 7/2004 | Frees | |
| 6,859,523 B1 | 2/2005 | Jilk | |
| 6,938,048 B1 | 8/2005 | Jilk | |
| 7,003,668 B2 | 2/2006 | Berson | |
| 7,020,697 B1 | 3/2006 | Goodman | |
| 7,039,596 B1 | 5/2006 | Lu | |
| 7,039,654 B1 | 5/2006 | Eder | |
| 7,086,062 B1 | 8/2006 | Faour | |
| 7,146,326 B1 | 12/2006 | White | |
| 7,155,400 B1 | 12/2006 | Jilk | |
| 7,349,920 B1 | 3/2008 | Feinberg | |
| 7,386,797 B1 * | 6/2008 | Chatterjee | G06Q 10/103 |
| | | | 715/965 |
| 7,401,131 B2 | 7/2008 | Robertson | |
| 7,418,482 B1 | 8/2008 | Lusher | |
| 7,428,723 B2 | 9/2008 | Greene | |
| 7,640,511 B1 | 12/2009 | Keel | |
| 7,644,145 B2 | 1/2010 | Rockwell | |
| 7,676,542 B2 | 3/2010 | Moser | |
| 7,702,532 B2 | 4/2010 | Vigil | |
| 7,778,866 B2 | 8/2010 | Hughes | |
| 7,779,039 B2 | 8/2010 | Weissman | |
| RE41,737 E | 9/2010 | Leem | |
| 7,792,795 B1 | 9/2010 | Swartz | |
| 7,805,327 B1 | 9/2010 | Schulz | |
| RE41,848 E | 10/2010 | Daniell | |
| 7,831,978 B2 | 11/2010 | Schaad | |
| 7,840,943 B2 | 11/2010 | Volkov | |
| 7,917,855 B1 | 3/2011 | Satish | |
| 7,941,453 B1 | 5/2011 | Scheevel | |
| 7,945,469 B2 | 5/2011 | Cohen | |
| 7,996,744 B2 | 8/2011 | Ojala | |
| 7,996,774 B1 | 8/2011 | Sidenur | |
| 8,214,747 B1 | 7/2012 | Yankovich | |
| 8,314,809 B1 | 11/2012 | Grabowski | |
| 8,499,300 B2 | 7/2013 | Zimberg | |
| 8,522,240 B1 | 8/2013 | Merwarth | |
| 8,527,287 B1 | 9/2013 | Bhatia | |
| 8,554,832 B1 | 10/2013 | Moskovitz | |
| 8,572,477 B1 | 10/2013 | Moskovitz | |
| 8,626,547 B2 | 1/2014 | Hirano | |
| 8,627,199 B1 | 1/2014 | Handley | |
| 8,639,552 B1 | 1/2014 | Chen | |
| 8,738,414 B1 * | 5/2014 | Nagar | G06Q 10/103 |
| | | | 705/7.12 |
| 8,768,751 B2 | 7/2014 | Jakowski | |
| 8,831,879 B2 | 9/2014 | Stamm | |
| 8,843,832 B2 | 9/2014 | Frields | |
| 8,863,021 B1 | 10/2014 | Bee | |
| 9,009,096 B2 | 4/2015 | Pinckney | |
| 9,024,752 B2 | 5/2015 | Tumayan | |
| 9,143,839 B2 | 9/2015 | Reisman | |
| 9,152,668 B1 | 10/2015 | Moskovitz | |
| 9,201,952 B1 | 12/2015 | Chau | |
| 9,208,262 B2 | 12/2015 | Bechtel | |
| 9,251,484 B2 | 2/2016 | Cantor | |
| 9,350,560 B2 | 5/2016 | Hupfer | |
| 9,383,917 B2 | 7/2016 | Mouton | |
| 9,405,532 B1 | 8/2016 | Sullivan | |
| 9,405,810 B2 | 8/2016 | Smith | |
| 9,454,623 B1 | 9/2016 | Kaptsan | |
| 9,514,424 B2 | 12/2016 | Kleinbart | |
| 9,600,136 B1 | 3/2017 | Yang | |
| 9,674,361 B2 | 6/2017 | Ristock | |
| 9,712,576 B1 | 7/2017 | Gill | |
| 9,785,445 B2 | 10/2017 | Mitsui | |
| 9,830,398 B2 | 11/2017 | Schneider | |
| 9,842,312 B1 | 12/2017 | Rosati | |
| 9,949,681 B2 | 4/2018 | Badenes | |
| 9,953,282 B2 | 4/2018 | Shaouy | |
| 9,959,420 B2 | 5/2018 | Kiang | |
| 9,978,040 B2 | 5/2018 | Lee | |
| 9,990,636 B1 | 6/2018 | Lewis | |
| 10,001,911 B2 | 6/2018 | Breedvelt-Schouten | |
| 10,003,693 B2 | 6/2018 | Wolthuis | |
| 10,083,412 B2 | 9/2018 | Suntinger | |
| 10,157,355 B2 | 12/2018 | Johnson | |
| 10,192,181 B2 | 1/2019 | Katkar | |
| 10,235,156 B2 | 3/2019 | Johnson | |
| 10,264,067 B2 | 4/2019 | Subramani | |
| 10,308,992 B2 | 6/2019 | Chauvin | |
| 10,373,084 B2 | 8/2019 | Kurjanowicz | |
| 10,373,090 B2 | 8/2019 | Holm | |
| 10,382,501 B2 | 8/2019 | Malatesha | |
| 10,455,011 B2 | 10/2019 | Kendall | |
| 10,496,943 B2 | 12/2019 | De | |
| 10,594,788 B2 | 3/2020 | Larabie-Belanger | |
| 10,606,859 B2 | 3/2020 | Smith | |
| 10,613,735 B1 | 4/2020 | Karpe | |
| 10,616,151 B1 | 4/2020 | Cameron | |
| 10,623,359 B1 | 4/2020 | Rosenstein | |
| 10,671,692 B2 | 6/2020 | Koopman | |
| 10,684,870 B1 | 6/2020 | Sabo | |
| 10,706,484 B1 | 7/2020 | Murnock | |
| 10,785,046 B1 | 9/2020 | Raghavan | |
| 10,810,222 B2 | 10/2020 | Koch | |
| 10,846,105 B2 | 11/2020 | Granot | |
| 10,846,297 B2 | 11/2020 | Smith | |
| 10,922,104 B2 | 2/2021 | Sabo | |
| 10,956,845 B1 | 3/2021 | Sabo | |
| 10,970,299 B2 | 4/2021 | Smith | |
| 10,977,434 B2 | 4/2021 | Pelz | |
| 10,983,685 B2 | 4/2021 | Karpe | |
| 11,082,281 B2 | 8/2021 | Rosenstein | |
| 11,095,468 B1 | 8/2021 | Pandey | |
| 11,113,667 B1 | 9/2021 | Jiang | |
| 11,138,021 B1 | 10/2021 | Rosenstein | |
| 11,140,174 B2 | 10/2021 | Patel | |
| 11,204,683 B1 | 12/2021 | Sabo | |
| 11,212,242 B2 | 12/2021 | Cameron | |
| 11,212,326 B2 | 12/2021 | Faulkner | |
| 11,263,228 B2 | 3/2022 | Koch | |
| 11,288,081 B2 | 3/2022 | Sabo | |
| 11,290,296 B2 | 3/2022 | Raghavan | |
| 11,327,645 B2 | 5/2022 | Karpe | |
| 11,341,444 B2 | 5/2022 | Sabo | |
| 11,341,445 B1 | 5/2022 | Cheng | |
| 11,783,253 B1 | 10/2023 | Pelz | |
| 2002/0065798 A1 | 5/2002 | Bostleman | |
| 2002/0082889 A1 | 6/2002 | Oliver | |
| 2002/0120480 A1 | 8/2002 | Kroeger | |
| 2002/0143594 A1 | 10/2002 | Kroeger | |
| 2003/0028595 A1 | 2/2003 | Vogt | |
| 2003/0036934 A1 | 2/2003 | Ouchi | |
| 2003/0041317 A1 | 2/2003 | Sokolov | |
| 2003/0097406 A1 | 5/2003 | Stafford | |
| 2003/0097410 A1 | 5/2003 | Atkins | |
| 2003/0126001 A1 | 7/2003 | Northcutt | |
| 2003/0200223 A1 | 10/2003 | Hack | |
| 2003/0225598 A1 | 12/2003 | Yu | |
| 2003/0233265 A1 | 12/2003 | Lee | |
| 2003/0233268 A1 | 12/2003 | Taqbeem | |
| 2004/0083448 A1 | 4/2004 | Schulz | |
| 2004/0093290 A1 | 5/2004 | Doss | |
| 2004/0093351 A1 | 5/2004 | Lee | |
| 2004/0098291 A1 | 5/2004 | Newburn | |
| 2004/0125150 A1 | 7/2004 | Adcock | |
| 2004/0162833 A1 | 8/2004 | Jones | |
| 2004/0187089 A1 | 9/2004 | Schulz | |
| 2004/0207249 A1 | 10/2004 | Baumgartner | |
| 2004/0230447 A1 | 11/2004 | Schwerin-Wenzel | |
| 2004/0233235 A1 * | 11/2004 | Rubin | G06F 16/9562 |
| | | | 715/738 |
| 2004/0268451 A1 | 12/2004 | Robbin | |
| 2005/0144232 A1 | 6/2005 | Estrada | |
| 2005/0204297 A1 | 9/2005 | Banatwala | |
| 2005/0210394 A1 | 9/2005 | Crandall | |
| 2005/0216111 A1 | 9/2005 | Ooshima | |
| 2005/0216324 A1 | 9/2005 | Maithell | |
| 2005/0216381 A1 | 9/2005 | Banatwala | |
| 2005/0222971 A1 | 10/2005 | Cary | |
| 2006/0028917 A1 | 2/2006 | Wigginton | |
| 2006/0041447 A1 | 2/2006 | Vucina | |
| 2006/0047454 A1 | 3/2006 | Tamaki | |

(56) References Cited

U.S. PATENT DOCUMENTS

| | | |
|---|---|---|
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0052358 A1* | 2/2008 | Beaven ............... G06Q 10/0633 |
| | | 709/205 |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0114809 A1 | 5/2008 | MacBeth |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2009/0307349 A1 | 12/2009 | Harris |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0169832 A1* | 7/2010 | Chang ................... G06F 16/954 |
| | | 715/811 |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0069643 A1 | 3/2011 | Yoakum |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0054095 A1 | 3/2012 | Lesandro |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0254299 A1 | 9/2013 | Burshtein |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |

(56) References Cited

U.S. PATENT DOCUMENTS

| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Brian |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0149173 A1 | 5/2015 | Korycki |
| 2015/0153906 A1 | 6/2015 | Liao |
| 2015/0178666 A1* | 6/2015 | Green ............ G06Q 10/063114 |
| | | 705/7.15 |
| 2015/0213411 A1 | 7/2015 | Swanson |
| 2015/0215256 A1 | 7/2015 | Ghafourifar |
| 2015/0262111 A1 | 9/2015 | Yu |
| 2015/0294245 A1 | 10/2015 | Nagar |
| 2015/0312375 A1 | 10/2015 | Valey |
| 2015/0317595 A1 | 11/2015 | De |
| 2015/0339006 A1 | 11/2015 | Chaland |
| 2015/0358468 A1 | 12/2015 | Erhart |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0162819 A1 | 6/2016 | Hakman |
| 2016/0180277 A1 | 6/2016 | Skiba |
| 2016/0180298 A1 | 6/2016 | Mcclement |
| 2016/0182311 A1 | 6/2016 | Borna |
| 2016/0188145 A1 | 6/2016 | Vida |
| 2016/0216854 A1 | 7/2016 | Mcclellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0292620 A1 | 10/2016 | De |
| 2016/0300024 A1 | 10/2016 | Janssen |
| 2016/0313934 A1 | 10/2016 | Isherwood |
| 2016/0328217 A1 | 11/2016 | Hagerty |
| 2016/0342927 A1 | 11/2016 | Reznik |
| 2016/0352812 A1* | 12/2016 | Ahlgren ................. G06Q 10/10 |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0052656 A1 | 2/2017 | Ohsumi |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0147960 A1 | 5/2017 | Jahagirdar |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285149 A1 | 10/2018 | Bhandari |
| 2018/0285471 A1 | 10/2018 | Hao |
| 2018/0315491 A1 | 11/2018 | Filipovich |
| 2018/0316636 A1 | 11/2018 | Kamat |
| 2018/0331842 A1 | 11/2018 | Faulkner |
| 2018/0357049 A1 | 12/2018 | Epstein |
| 2018/0365626 A1 | 12/2018 | Mansour |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |

(56) References Cited

U.S. PATENT DOCUMENTS

| | | | |
|---|---|---|---|
| 2019/0147386 A1 | 5/2019 | Balakrishna | |
| 2019/0187987 A1 | 6/2019 | Fauchère | |
| 2019/0197487 A1 | 6/2019 | Jersin | |
| 2019/0213509 A1 | 7/2019 | Burleson | |
| 2019/0265821 A1 | 8/2019 | Pearl | |
| 2019/0286462 A1 | 9/2019 | Bodnick | |
| 2019/0340166 A1* | 11/2019 | Raman | H04L 47/762 |
| 2019/0340296 A1 | 11/2019 | Cunico | |
| 2019/0340574 A1 | 11/2019 | Ekambaram | |
| 2019/0347094 A1 | 11/2019 | Sullivan | |
| 2019/0347126 A1 | 11/2019 | Bhandari | |
| 2019/0370320 A1 | 12/2019 | Kalra | |
| 2020/0019907 A1 | 1/2020 | Notani | |
| 2020/0059539 A1 | 2/2020 | Wang | |
| 2020/0063333 A1 | 2/2020 | Mahanty | |
| 2020/0065736 A1 | 2/2020 | Relangi | |
| 2020/0159507 A1 | 5/2020 | Bodin | |
| 2020/0160270 A1 | 5/2020 | Bodin | |
| 2020/0160377 A1 | 5/2020 | Bodin | |
| 2020/0160458 A1 | 5/2020 | Bodin | |
| 2020/0162315 A1 | 5/2020 | Siddiqi | |
| 2020/0192538 A1 | 6/2020 | Karpe | |
| 2020/0192908 A1 | 6/2020 | Smith | |
| 2020/0193556 A1 | 6/2020 | Jin | |
| 2020/0218551 A1 | 7/2020 | Sabo | |
| 2020/0219061 A1 | 7/2020 | Guo | |
| 2020/0228474 A1 | 7/2020 | Cameron | |
| 2020/0233879 A1 | 7/2020 | Papanicolaou | |
| 2020/0244611 A1 | 7/2020 | Rosenstein | |
| 2020/0293975 A1* | 9/2020 | Faulkner | G06Q 10/107 |
| 2020/0328906 A1 | 10/2020 | Raghavan | |
| 2020/0344253 A1 | 10/2020 | Kurup | |
| 2021/0004380 A1 | 1/2021 | Koch | |
| 2021/0004381 A1 | 1/2021 | Smith | |
| 2021/0097466 A1 | 4/2021 | Sabo | |
| 2021/0103451 A1 | 4/2021 | Sabo | |
| 2021/0110347 A1 | 4/2021 | Khalil | |
| 2021/0136012 A1 | 5/2021 | Barbitta | |
| 2021/0150135 A1 | 5/2021 | Lereya | |
| 2021/0150489 A1 | 5/2021 | Haramati | |
| 2021/0157978 A1 | 5/2021 | Haramati | |
| 2021/0166339 A1 | 6/2021 | Mann | |
| 2021/0182475 A1 | 6/2021 | Pelz | |
| 2021/0216562 A1 | 7/2021 | Smith | |
| 2021/0232282 A1 | 7/2021 | Karpe | |
| 2021/0248161 A1* | 8/2021 | Leston | G06F 16/273 |
| 2021/0319389 A1 | 10/2021 | Jafari | |
| 2021/0320891 A1 | 10/2021 | Rosenstein | |
| 2021/0342785 A1 | 11/2021 | Mann | |
| 2021/0342786 A1 | 11/2021 | Jiang | |
| 2021/0350303 A1 | 11/2021 | Omar | |
| 2021/0357380 A1 | 11/2021 | Morad | |
| 2021/0357423 A1 | 11/2021 | Haramati | |
| 2021/0357862 A1 | 11/2021 | Lereya | |
| 2021/0357863 A1 | 11/2021 | Cohen | |
| 2021/0382734 A1 | 12/2021 | Rosenstein | |
| 2021/0383261 A1 | 12/2021 | Hanna | |
| 2021/0390486 A1 | 12/2021 | Chu | |
| 2022/0019320 A1 | 1/2022 | Sabo | |
| 2022/0058548 A1 | 2/2022 | Garg | |
| 2022/0075792 A1 | 3/2022 | Koch | |
| 2022/0078142 A1 | 3/2022 | Cameron | |
| 2022/0158859 A1 | 5/2022 | Raghavan | |
| 2022/0171637 A1 | 6/2022 | Sabo | |
| 2022/0188715 A1 | 6/2022 | Cheng | |
| 2022/0214787 A1 | 7/2022 | Karpe | |
| 2022/0215315 A1 | 7/2022 | Sabo | |
| 2022/0284340 A1 | 9/2022 | Choudhary | |
| 2022/0343282 A1 | 10/2022 | Hood | |
| 2022/0414323 A1 | 12/2022 | Sreenivasan | |
| 2023/0061905 A1* | 3/2023 | Culver | G06Q 10/067 |
| 2023/0118369 A1 | 4/2023 | Louis | |
| 2023/0153732 A1 | 5/2023 | Akers | |
| 2023/0206152 A1 | 6/2023 | Nouri | |
| 2023/0239261 A1 | 7/2023 | Cameron | |
| 2023/0308409 A1 | 9/2023 | Rosenstein | |
| 2023/0325747 A1 | 10/2023 | Sabo | |
| 2024/0223517 A1 | 7/2024 | Cameron | |
| 2024/0257008 A1 | 8/2024 | Cheng | |
| 2024/0281738 A1 | 8/2024 | Sabo | |
| 2024/0323106 A1 | 9/2024 | Mann | |
| 2024/0346407 A1 | 10/2024 | Matson | |
| 2024/0420087 A1 | 12/2024 | Sabo | |
| 2025/0200143 A1 | 6/2025 | Varghese | |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

D. Surian, N. Liu, D. Lo, H. Tong, E.-P. Lim and C. Faloutsos, "Recommending People in Developers' Collaboration Network," 2011 18th Working Conference on Reverse Engineering, Limerick, Ireland, 2011, pp. 379-388, doi: 10.1109/WCRE.2011.53 (Year: 2011).

"U.S. Appl. No. 14/584,750, Examiner Interview Summary mailed Feb. 25, 2016". 3 pgs.

"U.S. Appl. No. 14/584,750, Non Final Office Action mailed Aug. 28, 2015". 21 pgs.

"U.S. Appl. No. 14/584,750, Notice of Allowance mailed Mar. 28, 2016", 8 pgs.

"U.S. Appl. No. 14/584,750, Response filed Feb. 29, 2015 to Non Final Office Action mailed Aug. 28, 2015", 16 pgs.

"U.S. Appl. No. 14/584,850, Final Office Action mailed Sep. 1, 2017", 31 pgs.

"U.S. Appl. No. 14/584,850, Non Final Office Action mailed Jan. 10, 2017", 9 pgs.

"U.S. Appl. No. 14/584,850, Response filed Apr. 10, 2017 to Non Final Office Action mailed Jan. 10, 2017", 13 pgs.

"How to Asana: Inviting teammates to Asana." YouTube, Asana, Mar. 21, 2017, https://www.youtube.com/watch?v=TLOruY1KyxU ( Year: 2017), 13 pages.

"Rules of Data Conversion from Document to Relational Databases", published: 2014, publisher: Future-processing, pp. 1-8 (Year: 2014).

(Tiburca, Andrew) Best Team Calendar Applications for 2018—Toggl https://toggl.com/blog/best-team-calendar-applications-for-2018 (Year: 2017) 3 pages.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios, youtube, excerpt, Aug. 1, 2019 https://www.youtube.com/watch?v=7XkNcfFDG6M (Year: 2019) (20 pages).

Asana YouTube channel, list of all product videos, Nov. 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana,Manage your team capacity with Workload, youtube, excerpt, Aug. 1, 2019 https://www.youtube.com/watch?v=2ufXyZDzZnA &list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

(56) References Cited

OTHER PUBLICATIONS

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).
Command and control, wikipedia, archives org, Mar. 16, 2018 https://web.archive.org/web/20180316193655/https://en.wikipedia.org/wiki/Command_and_control (Year: 2018), 6 pages.
Creating Tables with Fields from 2 Different Tables, published: 2009, publisher: StackOverflow, pp. 1-2. (Year: 2009).
Critical chain project management, Wikipedia, archives org, Dec. 17, 2016 https://web.archive.Org/web/20161217090326/https://en.wikipedia.org/wiki/Critical_chain_project_management (Year: 2016) 5 pages.
Critical Path Method, Wikipedia, archives org, Sep. 19, 2017 https://web.archive.Org/web/20170919223814/https://en.wikipedia.org/wiki/Critical_path_method (Year: 2017) 6 pages.
Dawei Li, "Deepcham: Collaborative Edge-Mediated Adaptive Deep Learning for Mobile Object Recognition", 2016, IEEE/ACM, pp. 64-76. (Year: 2016).
Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.
Hartmann, "TimeProjectscheduling with resource capacities and requests varying with time: a case study," 2013, Flexible services and manufacturing journal, vol. 25, No. 1, pp. 74-93 (Year: 2013).
Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTvVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv30 (Year: 2017) (24 pages).
How to Asana, Planning with Asana calendar, youtube excerpt, Feb. 14, 2017 https://www.youtube.com/watch?v=w8t6KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
Justin Rosenstein, Unveiling the Future of Asana, Mar. 28, 2018 https://www.youtube.com/watch?v=nRI?d_WM4Bc (Year: 2018) (2 pages).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).
Macro, computer science, wikipedia, archives org, 6 pages, Feb. 11, 2020 http://web.archive.org/web/20200211082902/https://en.wikipedia.org/wiki/Macro_(computer_science) (Year: 2020) 6 pages.
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).
Paul Minors, How to automate your tasks, youtube excerpts, Oct. 18, 2019 https://www.youtube.com/watch?v=lwF9XyUQrzw (Year: 2019).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
Wix.com, How to Use Wix Code with Marketing Tools to Create Custom Events, Oct. 18, 2018, YouTube, https://www.youtube.com/watch?v=MTBVykOYGvO&feature=emb_title, 2 pages.
www.asana.com (as retrieved from https://web.archive.Org/web/20160101054536/https://asana.com/press and https://web.archive.org/web/20160101054527/https://asana.com/product) (Year: 2016) 15 pages.
www.cogmotive.com/blog/author/alan Alan Byrne: "Creating a company Shared Calendar in Office 365"; pp. 1-17; Sep. 10, 2013 (16 pages).
Asana Project Management 2017 Beginner Training Tutorial - How To Use Asana. Aug. 9, 2017. (available at: https:// www.youtube.com/watch?v=XgTZT5d_njk) (Last accessed Jan. 16, 2025) 4 pages.

* cited by examiner

300

400

SYSTEMS AND METHODS TO GENERATE RECORD RECOMMENDATIONS FOR USERS OF COLLABORATION ENVIRONMENT

FIELD OF THE DISCLOSURE

The present disclosure relates to monitoring online activity of users of a collaboration environment and generating record recommendations for the users.

BACKGROUND

Web-based collaboration environments, sometimes referred to as work management platforms, may enable users to assign projects, tasks, and/or other work assignments to assignees (e.g., other users) to complete. A collaboration environment may comprise an environment in which individual users and/or a virtual team of users does its work and enables the users to work in a more organized and efficient manner when remotely located from each other.

SUMMARY

Hosting a web-based collaboration environment poses many challenges. For example, operating the collaboration environment may require precise ways of creation, storage, management, and/or provision of information that makes up the collaboration environment. A way that operators look to improve the operation of the collaboration environment is to improve parts of the collaboration environment involving substantial human-machine interaction and/or parts that fall short of providing intuitive experiences for the users. Improvements may be directed to improving the way in which users access records of the collaboration environment and/or to access and/or view certain information in one or more records. Traditionally, users may navigate through a user interface of the collaboration environment in order to track down records of interest, including looking for specific records, as well as discovering something new. However, many may find it difficult to track down records for work and/or are simply unaware of records that may be meaningful to them. This can make users feel like they don't have context of pertinent going-ons at their organization, and can hinder collaboration.

A recommender system, or a recommendation system (sometimes replacing "system" with "platform" or "engine"), is a subclass of information processing systems that traditionally provide recommendations for items that are most pertinent to a particular user. The recommendations may refer to various decision-making processes, such as what product to purchase, what multimedia item to watch, and others. Recommender systems are particularly useful when a user needs to choose an item from a potentially overwhelming number of items that a service may offer. Recommender systems may implement one or more approaches. The approaches may include one or more of collaborative filtering, content-based filtering (sometimes referred to the personality-based approach), knowledge-based systems, and/or other approaches. There has yet to be a recommender system adapted for use with record recommendations for users of a collaboration environment.

To address these and/or other problems, one or more implementations presented herein propose a technique to generate record recommendations for users of collaboration environment. Recommendations for records of work provide a way for users to easily find and join work being managed in the collaboration environment. Based on interactions of individual ones of the users with individual ones of the records within the virtual collaboration environment, the system can recommend records for work that the user may be interested in joining, viewing, and/or otherwise collaborating on. These recommendations may be presented in a user interface, and provide information about the work's activity, its members (highlighting members that the user interacts with most), include options to join or view pages for the work, and/or provide other features and/or functionality.

One or more implementations presented herein may leverage computer-based modeling techniques including, but not limited to, machine learning models. By way of non-limiting illustration, one or more machine learning models may be specially trained to facilitate the identification of records that should be recommended to users. In some implementations, a model may utilize one or more approaches adapted from traditional recommender systems, such as collaborative filtering. A machine learning model may carry out processing steps and perform functionality that a human could not practically do, and/or in ways that may be unintuitive to humans.

These, along with other features and/or functionality presented herein, may be recognized by persons of ordinary skill in the art as providing improvements upon the operation of a collaboration environment including, among others, increased efficiency and accuracy in the creation and management of records and/or the information making up the records of the collaboration environment, and/or improvements in the user interfaces of collaboration environments. Further, persons of ordinary skill in the art will recognize that feature(s) and/or functionality described herein is necessarily rooted in computer technology at least because of one or more computer-based modeling approaches described herein, and/or because the collaboration environment itself is necessarily rooted in modern Internet technologies including, among other, the ability to identify and track remote-user activity within web-based platforms to derive information about user interactions.

One or more implementations of a system configured to generate record recommendations for users of collaboration environment may include one or more of non-transitory electronic storage, one or more hardware processors configured by machine-readable instructions, and/or other components. Executing the machine-readable instructions may cause the one or more hardware processors to facilitate generating record recommendations for users of collaboration environment. The machine-readable instructions may include one or more computer program components. The one or more computer program components may include one or more of an environment state component, a user interface component, a recommendation component, and/or other components.

The environment state component may be configured to manage environment state information maintaining the collaboration environment. The collaboration environment may be configured to facilitate interaction by users with the collaboration environment. The environment state information may include one or more records. The records may include one or more of user records including user information describing the users of the collaboration environment, work unit records including work unit information describing units of work that are managed, created, and/or assigned within the collaboration environment, and/or other records.

The environment state component may be configured to determine interaction information for the users and/or other information. The interaction information may include interaction values for an interaction attribute and/or other information. The interaction attribute may characterize interactions of individual ones of the users with individual ones of the work unit records. An individual interaction value may correspond to an individual one of the work unit records and an individual one of the users. By way of non-limiting illustration, the interaction information may include one or more of a first interaction value for a first user corresponding to a first work unit record, a second interaction value for a second user corresponding to the first work unit record, a third interaction value for the second user corresponding to a second work unit record, and/or other information.

The recommendation component may be configured to generate, for the individual users, record recommendations. The record recommendations may be generated for the individual users based on the interaction information of other users who are determined to be similar to the individual users. An individual record recommendation may include a recommendation for an individual user to interact with an individual work unit record that the individual user has yet to interact with, but at least one similar user has. By way of non-limiting illustration, recommendation component may be configured to generate, for the first user, a first record recommendation to interact with the second work unit record based on the first user being similar to the second user and the first user having yet to interact with the second work unit record.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
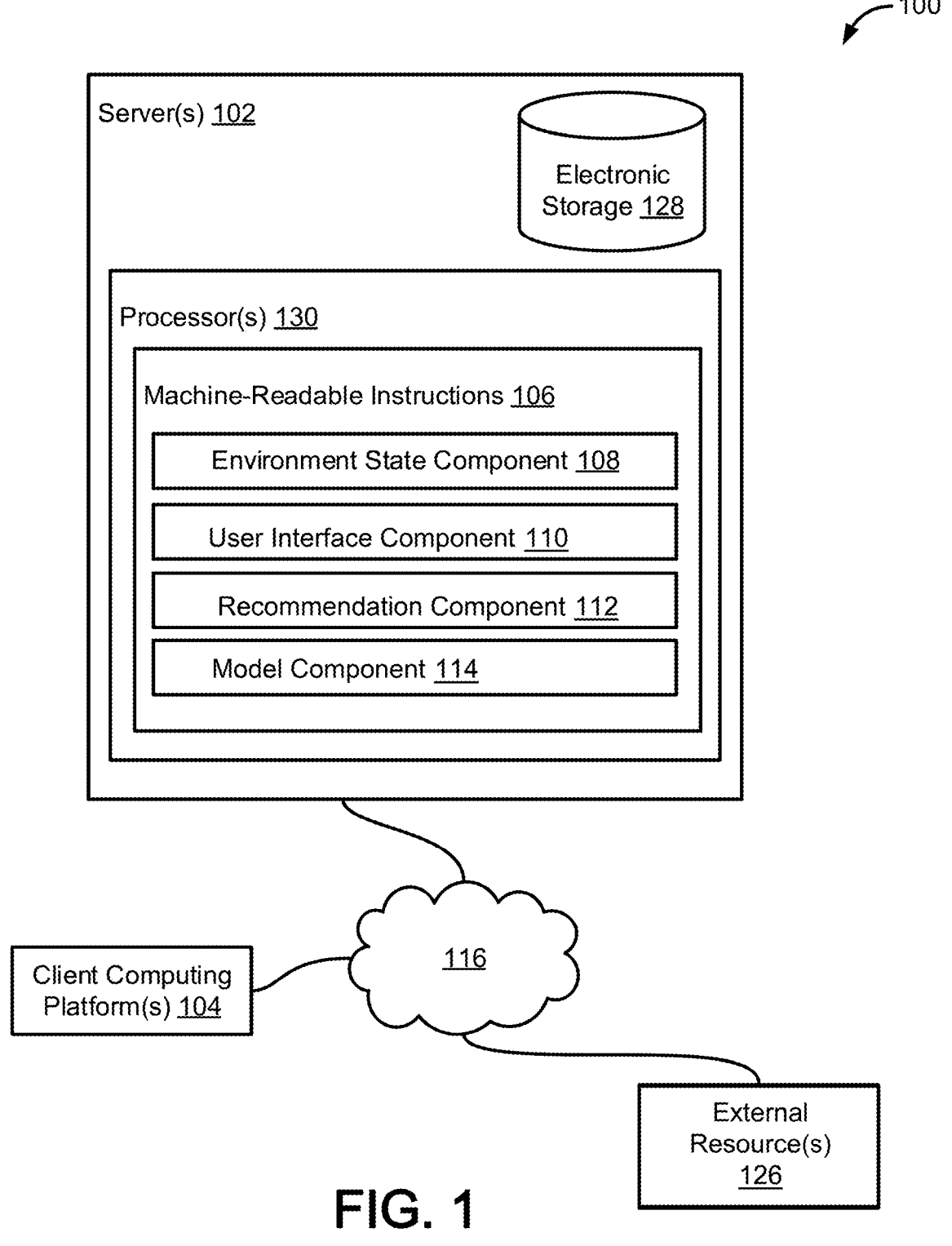
FIG. 1 illustrates a system configured to generate record recommendations for users of collaboration environment, in accordance with one or more implementations.

FIG. 1 illustrates a system 100 configured to generate record recommendations for users of collaboration environment, in accordance with one or more implementations. Some users may find it difficult to locate, or even become aware of, records for work they should view, join, and/or otherwise interact with. This can make users feel like they don't have full context of everything going on at their organization, and can hinder collaboration. Recommendations provide a way for users to easily find and join work being managed in the collaboration environment. Based on information about users' interactions with records for work, the system 100 can recommend records for work that the user may be interested in viewing, joining, and/or otherwise collaborating on. These recommendations may be presented in a user interface, and provide information about the work's activity, its members (highlighting members that the user interacts with most), include options to join or view pages for work, and/or provide other features and/or functionality. One or more implementations presented herein may leverage one or more specially trained machine learning models.

In some implementations, system 100 may include one or more of one or more servers 102, one or more client computing platforms 104, external resource(s) 126, and/or other components. Server(s) 102 may be configured to communicate with one or more client computing platforms 104, one or more external resources 126, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104. Server(s) 102 may be remote from client computing platform(s) 104. Client computing platform(s) 104 may be remote from each other.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate generating record recommendations for users of collaboration environment. The computer program components may include one or more of an environment state component 108, user interface component 110, a recommendation component 112, a model component 114, and/or other components.

Environment state component 108 may be configured to manage environment state information and/or other information used in maintaining a collaboration environment. The collaboration environment may be configured to facilitate interaction by users with the collaboration environment. The environment state information may include one or more records. The one or more records may include one or more of user records, work unit records, and/or other records. The user records may include user information describing the users of the collaboration environment. The work unit records may include work unit information describing units of work assigned to, created by, and/or managed by the users within the collaboration environment.

The user information in the user records may include values of user parameters and/or other information. The values of the user parameters may be organized in the user records corresponding to users interacting with and/or viewing the collaboration environment. The values of the user parameters may include information describing and/or identifying the users, their actions within the collaboration environment, their settings, metadata associated with the users, work they are members of and/or collaborate on, and/or other user information. Individual ones of the users may be associated with individual ones of the user records. A user record may define values of the user parameters associated with a given user.

The values of the user parameters may, by way of non-limiting example, specify one or more of: a user name, a group, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), work inclusion information (e.g., identification of work unit records they are members of and/or collaborate on), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (e.g., units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

Schedule information for the individual users may include one or more calendar entries associated with the individual users. The individual calendar entries may be associated with individual start dates and individual end dates. In some implementations, schedule information may be stored locally within electronic storage 128 by virtue of features and/or functionality provided within a collaboration environment. By way of non-limiting illustration, a collaboration environment may have features and/or functionality of a calendar application configured to facilitate calendaring entries into a schedule. It is noted that schedule information may be determined through features and/or functionality provided by one or more external resources 126. By way of non-limiting illustration, external resources may include a calendar application which may be external to a collaboration environment. The collaboration environment may have permissions to access the external calendar application to determine and/or obtain schedule information.

Work inclusion information may include identification(s) of work unit records that individual users are members of and/or collaborate with one or more other users on.

Collaboration between users may include performing shared and/or cooperative actions within the collaboration environment to complete one or more of the units of work. The shared and/or cooperative actions may include one or more of communication actions, work completion actions, and/or other actions. One or more implementations of the present disclosure may be configured to leverage the fact that users may be interacting with the collaboration environment and/or each other in synchronous and/or asynchronous ways using remotely located client computing platforms. For example, a user may log into the collaboration environment and perform one or more actions and then sign out. The user may log in at a later date and notice that the collaboration environment has changed due to changes that were made by one or more other users while they were signed out. Accordingly, collaboration between users may have been occurring without any direct knowledge of other user's actions within the collaboration environment. At least some of the collaboration between users may be non-intuitive and/or not immediately knowable. Instead, one or more implementations described herein may take advantage of the existence of the work unit records that are stored and maintained by server(s) 102 which store and track user actions. From these records, collaboration may then be derived and/or determined in ways that would otherwise not be possible by the users individually and/or together.

Communication actions may include communicating within and/or outside the collaboration environment about a unit of work in an effort to advance progress toward completion of the unit of work and/or other units of work associated with the unit of work. Communicating within the collaboration environment may include one or more of adding comments to a comment thread, messaging via chat interfaces of the collaboration environment, adding comments as metadata to digital content items that are associated with a unit of work, "@" mentioning one or more users, and/or other actions. Communicating outside the collaboration environment may include one or more of communication through e-mail, generating calendar items that relate to completion of a unit of work, conducting meetings (in person and/or virtual), messaging via chat interfaces that are external to the collaboration environment, and/or other actions.

Work completion actions may include actions performed within the collaboration environment that are related to advancing progress of one or more work unit records for one or more units of work. The actions may include one or more of creating work unit records, assigning work unit records, marking units of work as complete, adding due dates to units of work, and/or other actions.

The "members" of the work unit records may include specifically-named users within the work unit records. Specifically naming users may be accomplished by linking user records for those users to the work unit records. Linking the user records to the work unit records may comprise including a referential notation of the user records in the work unit records. Linking the user records to the work unit records may comprise including copies or instances of the user records in the work unit records. In some implementations, users having a particular status with respect to a work unit record may be considered members. By way of non-limiting illustration, users who are designated to perform one or more actions to facilitate completion of the units of work (e.g., assignees, assignors, creators, managers, collaborators, and/or other users) may be considered members. In some implementations, "member" status may be a status that is separate and distinct from users who are actively performing one or more actions to facilitate completion of the units of work. In some implementations, "member" may refer to users who view, access, monitor, and/or otherwise engage with units of work in ways that may not directly facilitate completion of the units of work.

The work unit information in the work unit records may include values of one or more work unit parameters and/or other information. The values of the work unit parameters may be organized in work unit records corresponding to units of work managed, created, and/or assigned within the collaboration environment. A given unit of work may have one or more assignees, owners, and/or collaborators working on the given work unit. Units of work may include one or more of tasks, projects, objectives, portfolios, and/or other units of work.

Units of work may be created by a given user for the given user and/or created by the given user and assigned to one or more other users. Units of work may be created by a given user for the given user and/or created by the given user and managed by one or more other users. Tasks may include to-do items and/or action items one or more users should accomplish and/or plan on accomplishing in order to complete a task. Individual units of work may include and/or may be associated with one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access (or restricted from marking complete) by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, the hierarchical information may specify that individual records are concurrently subordinate to more than one other record in more than one hierarchy. This may be referred to as "multi-homing" of a record. By way of non-limiting illustration, a record may be subordinate to two other records within two different hierarchies. Stated otherwise, the record may be considered "multi-homed" with respect to the two other records. In the case of multi-homing, presence of a multi-homed record in multiple other superior records may be established through separate instances of the same multi-homed record in each of the other superior records. The multi-homed record thus may be accessed through either of the pages of the superior records.

In some implementations, values of work unit parameters may specify one or more of a unit of work name, a unit of work description, user role information, one or more unit of work dates (e.g., a start date, a due date or end date, a completion date, and/or dates), project inclusion (e.g., identification of projects supported by the individual units of work), objective inclusion (e.g., identification of objectives supported by the individual units of work), one or more members associated with a unit of work (e.g., an owner, one or more collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, dependency information, one or more custom fields (e.g., priority, cost, stage, and/or other custom fields), and/or other information.

In some implementations, work unit parameters may include one or more of a work assignment parameter, a work completion parameter, a work management parameter, a work creation parameter, a dependency parameter, a grouping parameter, and/or other parameters. The values of the work assignment parameter may describe assignees of individual units of work. The values of the work management parameter may describe users who manage individual units of work and/or the extent in which they manage. The values of the work creation parameter may describe creation characteristics of individual units of work. The creation characteristics may include who created the work unit record, when it was created, and/or other information.

In some implementations, values of a dependency parameter may describe whether a given unit of work is dependent on one or more other units of work. A unit of work being dependent on an other unit of work may mean the unit of work may not be completed, started, assigned, and/or have other interactions performed in relation to the unit of work before some action is performed on the other unit of work. By way of non-limiting illustration, a unit of work may not be started until another unit of work is completed, meaning the unit of work may be dependent on the other unit of work. In some implementations, values of the dependency parameter may go hand in hand with the hierarchical information. By way of non-limiting illustration, a unit of work that is subordinate to an other unit of work may be dependent on the other unit of work, or vice versa.

The values of the work assignment parameter describing assignment of users to units of work may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work completion parameter may indicate that a completion status of a unit of work has changed from "incomplete" to "marked complete" and/or "complete." In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date). In some implementations, a completion status may include one or more of "rejected," "revisions required," "incomplete," and/or other statuses. By way of non-limiting illustration, for units of work that require one user to review work by another user, additional user interface elements may be presented where users can set the status as one or more of "marked complete," "incomplete," "rejected," "revisions required," and/or other statuses. In some implementations, a status of rejected for a unit of work may be associated with the passing of an end date associated with the unit of work without the work having been marked complete manually. In some implementations, a status of rejected for a unit of work may be associated with a user specifying the unit of work as rejected. In some implementations, a status of revisions required for a unit of work may be associated with a user specifying that the work being reviewed requires changes, but is otherwise approved. In some implementations, a status of revisions required may present the reviewing user with options to specify what revisions are required. In some implementations, a status of revisions required may cause a follow up unit of work to be generated which is assigned back to the assignor of the original work.

In some implementations, values of a grouping parameter may describe whether a given unit of work supports (e.g., is included in) a project and/or objective. The values may specify one or more of a name/title of another work unit record (e.g., project, objective), a name/username of an owner of another work unit record, and/or other information.

In some implementations, managing the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more spatial arrangements. The particular spatial arrangement used by a user may be stored as part of a user record for the user. The spatial arrangements may include one or more of a list view, a calendar view, a board view, and/or other views. The list view may include a vertical arrangement of graphic icons representing work unit records. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.). The board view may include a grid of cells comprising columns and rows, where visual content item (e.g., icons) representing work unit records may be positioned in the cells. Columns may be associated with sections (e.g., different hierarchies, groupings, etc.), and the cells within the column may be populated with visual content item representing work unit records that are associated with the sections.

In some implementations, environment state component 108 may be configured to manage information defining work unit pages (sometimes referred to simply as "pages") corresponding to the individual units of work. Individual work unit pages may provide access to individual units of work and/or their records. Managing information may include one or more of determining, obtaining, receiving, requesting, checking, storing, modifying, and/or other operations. Managing information defining individual work unit pages may include providing information to the user interface component 110 to effectuate presentation of the work unit pages, and/or other information. In some implementations, individual work unit pages may include individual sets of interface elements displaying the values of one or more of the work unit parameters of the individual units of work.

Users may access work unit records via the work unit pages by viewing, adding, changing, deleting, and/or otherwise interacting with values of work unit parameters stored by the work unit records. In some implementations, work unit pages providing access to tasks may be referred to as task pages; work unit pages providing access to projects may be referred to as project pages; and work unit pages providing access to objectives may be referred to as objective pages. In some implementations, user pages may include views of the collaboration environment that provide access to user records.

In some implementations, work unit records may define tasks. The work unit records defining tasks may be referred to as "task records." The work unit information that defines tasks may be referred to as "task information" and/or other information. Task information may include values of work unit parameters for tasks managed within the collaboration environment. The work unit parameters for tasks may be referred to as "task parameters." The work unit parameters comprising task parameters may be specific to tasks and/or may include one or more parameters not shared with projects, objectives, and/or other records. The task parameters may characterize one or more tasks created, assigned, and/or managed within the collaboration environment and/or via the collaboration environment, and/or the metadata associated with the one or more tasks.

In some implementations, work unit records may define projects. The work unit records defining projects may be referred to as "project records." The work unit information that defines projects may be referred to as project information and/or other information. Project information may include values of work unit parameters for projects managed within the collaboration environment. The work unit parameters for projects may be referred to as "project parameters." The work unit parameters comprising project parameters may be specific to projects and may include one or more parameters not shared with tasks, objectives, and/or other records. The project parameters may characterize one or more projects created, owned, assigned, and/or managed within the collaboration environment and/or via the collaboration environment, and/or the metadata associated with the one or more projects. Individual ones of the projects may be associated with individual ones of the records. A given project may have one or more owners and/or one or more collaborators working on the given project. The given project may be associated with one or more other units of work assigned to one or more users under the given project heading. In some implementations, projects may include one or more units of work that may directly facilitate progress toward fulfillment of the projects. Accordingly, completion of units of work may directly contribute to progress toward fulfillment of the project. By way of non-limiting illustration, an individual project may be associated with a client, and the units of work under the individual project heading may be work directly contributing to the fulfillment of a business relationship with the client.

The values of the project parameters may, by way of non-limiting example, include one or more of: one or more units of work associated with individual ones of the projects (which may include values of other work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, work unit records may define objectives. The work unit records defining objectives may be referred to as "objective records." The work unit information defining objectives may be referred to as "objective information." The objective information may include values of one or more work unit parameters that define the objectives. The values of the work unit parameters may be organized in records corresponding to objectives (sometimes referred to as "business objectives") managed, created, and/or owned within the collaboration environment. The work unit parameters corresponding to objectives may be referred to as "objective parameters." The work unit parameters comprising objective parameters may be specific to objectives and may include one or more parameters not shared with tasks and/or projects. A given objective may have one or more collaborators, and/or team members working on the given objective. Objectives may be associated with one or more units of work one or more users should accomplish and/or plan on accomplishing. Objectives may be created by a given user for the given user and/or created by the given user and assigned to be owned to one or more other users. Individual objectives may include one or more of an individual goal, an individual sub-goal, and/or other business objectives assigned to be owned by a user and/or associated with one or more users.

The objectives may be associated with a set of units of work that may indirectly facilitate progress toward fulfillment of the objectives. The set of units of work may not directly contribute to the progress. By way of non-limiting illustration, a connection between the set of units of work and a corresponding objective may be indirect in that completion of at least one of the units of work may have no direct impact on progress toward fulfillment of the objective. The concept of "no direct impact" may mean that completion of the at least one unit of work may not cause progress toward fulfillment of the business objective without independent action outside of the at least one unit of work and/or project. Instead, the fulfillment of the at least one unit of work may make such independent action more likely (e.g., through coercion, assistance, education, incentivization, reminder, etc.). However, in some implementations, objectives may be associated with one or more units of work that may directly facilitate progress toward fulfillment of the objectives. Accordingly, completion of the set of units of work may directly contribute to the progress toward fulfillment. Objectives may be associated with an objectives and key result (OKR) goal-setting framework. Objectives may be specified on one or more of a team basis, organization basis, and/or other specifications. In some implementations, objectives may be characterized as user objectives. User objectives may be specified on an individual user basis. A user objectives may be associated with a set of units of work assigned to a user that may indirectly (and/or directly) facilitate progress toward fulfillment of the user objective.

In some implementations, objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing objectives owned by the individual users may be determined based on one or more interactions by one or more users with a collaboration environment. In some implementations, one or more users may create and/or assign ownership of one or more objectives to themselves and/or another user. In some implementations, a user may be assigned to own an objective and the user may effectuate a reassignment of ownership of the objective from the user or one or more other users.

Progress information for the individual objectives may convey progress toward fulfillment of the individual objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual objectives may be determined independently from incremental completion of the units of work associated with the individual objectives. The completion of the units of work associated with a given objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

User role information may specify one or more roles of individual users. A role may represent a position of an individual user. A role may represent one or more of how a user works, how a user is expected to work, how a user intends to work, and/or other considerations. The position may be specified based on a description of one or more of a job title, level, and/or other descriptions of position. A role may be specified with respect to a business organization as a whole and/or other specifications. By way of non-limiting illustration, a role may include one or more of the following: chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within work unit records. A role may convey expected contribution of a user in completing and/or supporting a unit of work. By way of non-limiting illustration, a role within a work unit record may include one or more of owner, manager, creator, reviewer, approver, final decision maker, assignee, assignor, helper, liaison, and/or other descriptions. The individual roles of individual users within some units of work (e.g., a task) may be specified separately from the individual roles of the individual users within other units of work (e.g., a project associated with the task). The individual roles of individual users within the work unit records may be specified separately from the individual roles of the individual users within a business organization as a whole. For example, a business owner may have an "owner" role with respect to a business organization as a whole, while having a "reviewer" role within a project.

In some implementations, work unit records may define portfolios. The work unit records defining portfolios may be referred to as "portfolio records." The work unit information that defines portfolios may be referred to as portfolio information and/or other information. Portfolio information may include values of work unit parameters for portfolios managed within the collaboration environment. The work unit parameters for portfolios may be referred to as "portfolio parameters." The work unit parameters comprising portfolio parameters may be specific to portfolios and may include one or more parameters not shared with tasks, objectives, project, and/or other records. The portfolio parameters may characterize one or more portfolios created, owned, assigned, and/or managed within the collaboration environment and/or via the collaboration environment, and/or the metadata associated with the one or more portfolios. Individual ones of the portfolios may be associated with individual ones of the records. A given portfolio may have one or more owners and/or one or more collaborators working on the given portfolio. The given portfolio may be associated with one or more other units of work assigned to one or more users under the given portfolio heading. In some implementations, portfolios may include one or more units of work that may directly facilitate progress toward fulfillment of the portfolios. Accordingly, completion of units of work may directly contribute to progress toward fulfillment of the portfolio.

The values of the portfolio parameters may, by way of non-limiting example, include and/or specify one or more of: information about one or more projects within a given portfolio (which may include values of project parameters defined by one or more project records), information about one or more other portfolios within a given portfolio (which may include values of portfolio parameters defined by one or more other portfolio records), a portfolio name, a portfolio description, a status and/or progress (e.g., an update, a hardcoded status update, a measured status, quantity of units of work remaining in a given project, completed units of work in a given project, and/or other status parameter), one or more attachments, notification settings, privacy settings, an associated URL, one or more interaction parameters (e.g., sources of the interactions, context of the interactions, content of the interactions, time for the interactions, and/or other interaction parameters), updates, ordering of projects within the given portfolio, hierarchical information, permissions information, state of a workspace for a given project within the given portfolio, metadata associated with the portfolios, custom fields (e.g., values created by users), and/or other information.

In some implementations, environment state information may be continually monitored and/or updated as users interact with the collaboration environment over time. The environment state component 108 may store and/or archive the environment state information continuously, periodically, and/or based on user request to archive. The stored and/or archived environment state information may be referred to as historical environment state information and/or other information.

The environment state component 108 may be configured to determine interaction information for users, and/or other information. The interaction information may include interaction values for an interaction attribute and/or other information. The interaction attribute may characterize interactions of individual ones of the users with individual ones of the work unit records. An individual interaction value may correspond to an individual one of the work unit records and an individual one of the users. In some implementations, interactions with individual work unit records may be facilitated through work unit pages of the individual work unit records presented within a user interface of a collaboration environment.

The environment state component 108 may be configured to generate interaction information from the environment state information and/or other information. By way of non-limiting illustration, the environment state component 108 may generate interaction information based on monitoring change in environment state information as users interact with the collaboration environment over time. That is, as users interact with the collaboration environment remotely via client computing platform(s) 104, the environment state information may be updated to reflect such interactions. In some implementations, environment state component 108 may monitor users individually as the users interact with the collaboration environment over time to determine the impact of the users' interactions on the environment state information.

Considering a domain of users, the interaction information for the users may be represented as an m×n user-record matrix with user-named rows, record-named columns, and cells that are the interaction values for each user with respect to each record within that domain. At the user level, each user may be associated with a 1×n vector of interaction values, with each cell corresponding to an individual record and storing an individual interaction value. Within a domain, it is likely a given user has not interacted with all records. Thus, many cells in the user-project matrix or user vector may have null or zero values. Stated otherwise, records that are yet-to-be interacted with by a user may have null or zero values as interaction values.

In some implementations, interaction values may be expressed quantitatively. In some implementations, quantity may comprise an integer value and/or other expressions. Frequency may be measured as an amount over a particular period of time or in a given sample. In some implementations, the particular period of time may include one or more of all time, a predetermined time window, and/or other measures. A predetermined time window may be relative to an event, e.g., a given window of time immediately prior to generating a record recommendations, a window of time following some event (e.g., start of employment, start of moving to a new team, etc.), and/or other information. A predetermined time window may be relative to a time measure, e.g., this year, last year, this quarter, the first quarter of this year, the first half of this year, the last quarter of this year, the first two weeks following employment, etc. In some implementations, a predetermined time window may be specified by a user (e.g., from Aug. 29, 2021 to Jan. 16, 2022).

In some implementations, interactions with individual work unit records may be classified by interaction types. The interaction types may include one or more of visitation type, sharing type, collaboration type, creation type, multi-homing type, and/or other types.

Interactions of the visitation type may include visitations to pages of individual records. Visitation may include one or more of selecting to view a page of a record, viewing a page of a record, navigating to a page of a record (from another page and/or from a resource outside the collaboration environment, such as email or instant messages), viewing a page of a record for a given period of time, upvoting a record (e.g., selecting a "favorite" or "like" button), and/or other actions. In some implementations, interaction values of the visitation type may convey one or more of quantity of visitations, frequency of visitations, visitation return rate, and/or other information.

Interactions of the sharing type may include instances of sharing pages of individual records. Sharing may be performed by linking, copying, messaging (internally or externally) and/or otherwise directing to a page of a record within and/or outside the collaboration environment (e.g., via email or instant messaging). In some implementations, interaction values of the sharing type may convey one or more of quantity of sharing, frequency of sharing, and/or other information.

Interactions of the collaboration type may include the shared and/or cooperative actions within the collaboration environment described herein. In some implementations, interactions of the collaboration type may include becoming a member of a record. In some implementations, interaction values of the collaboration type may convey one or more of quantity of shared and/or cooperative actions, frequency of shared and/or cooperative actions, amount of different shared and/or cooperative actions, and/or other information.

Interactions of the creation type may include the creation actions. Creation actions may include one or more of creating records, creating associations between records (e.g., tasks within projects, subtasks within tasks, etc.), creating and/or applying one or more automation rules within a record, and/or other actions. In some implementations, interaction values of the creation type may convey one or more of quantity of creation actions, amount of different creation actions, frequency of creation actions, and/or other information.

Interactions of the multi-homing type may include generation of hierarchical information specifying that individual records are concurrently subordinate to more than one other record in more than one hierarchy. In some implementations, interaction values of the multi-homing type may convey one or more of whether a work unit record has been multi-homed, quantity of multi-homed work unit records, frequency of specifying multi-homing, and/or other information.

In some implementations, individual interaction values for individual users with respect to individual work unit records may be generated by aggregating individual sets of interaction values for individual work unit records. For example, for a given user and work unit record, an interaction value may be determined per interaction type to generate a set of interaction values for that work unit record. Then, the set of interaction values may be aggregated to produce an aggregate interaction value which is the "final" interaction value for that user for that work unit record. Aggregating a set of values may include one or more of averaging the values, determining a median, determining a mode, and/or other techniques.

In some implementations, individual weights may be assigned to individual interaction values as part of aggregating the interaction values. In some implementations, individual weights may be assigned based on the interaction types. Individual interaction types may correspond to individual predetermined weights. In some implementations, weights may be applied in an aggregation calculation as fractional values. By way of non-limiting illustration, weights may be expressed as values within a sliding scale in a range of zero to one, and/or other ranges. Zero may convey a lowest weight; one may convey a highest weight; and decimal values therebetween may convey various degrees of weighting an individual value. By way of non-limiting illustration, zero weight may convey no consideration; 0.25 may convey a low consideration; 0.5 may convey a neutral; 0.75 may convey a moderate consideration; and 1.0 may convey a full consideration. In some implementations, operators of the collaboration environment may specify the weights. In some implementations, a range of weights may be specified that it is possible to "overweight" a particular interaction by weights above 1 (e.g. a particular interaction type, like creating templates/automation indicates a very high level of user engagement), and/or to "penalize" a particular interaction by negative weights below zero (e.g. unsubscribing from a message thread associated with a work unit record may indicate a user intentionally does not wish to engage with it).

By way of non-limiting illustration, the interaction information may include one or more of a first interaction value for a first user corresponding to a first work unit record, a second interaction value for a second user corresponding to the first work unit record, a third interaction value for the second user corresponding to a second work unit record, and/or other information.

In some implementations, recommendation component 112 may be configured to generate, for the individual users, record recommendations. The record recommendations may be generated for the individual users based on the interaction information of other users who are determined to be similar to the individual users. An individual record recommendation may include a recommendation for an individual user to interact with an individual work unit record that the individual user has yet to interact with, but at least one similar user has. A given recommendation may include one or more specific interactions that a user should carry out. By way of non-limiting illustration, a recommendation may recommend one or more of a visiting a page, sharing a page, multi-homing a record with other records, adding a comment, becoming a member, creating a record hierarchy, creating one or more subordinate or superior records with respect to a given record, and/or other interactions described herein and/or within the scope of this disclosure as would be understood by a person having ordinary skill in the art.

One or more work unit records that an individual user has yet to interact with may be identified based on the presence of null or zero interaction values for those work unit records. In some implementations, record recommendations and/or user similarity may be determined by recommendation component 112 through techniques such as collaborative filtering, content-based filtering, and/or other techniques. One or more of these techniques may be adapted for particular use within a collaboration environment context.

Collaborative filtering stems from a concept that users often get relevant (e.g., most likely to act upon) recommendations from other users with "tastes" similar to themselves. Collaborative filtering may involve techniques for matching users with similar interests and making recommendations on this basis. Traditionally, collaborative filtering algorithms require the users' active participation through self-reporting of preferences, typically by "rating" items on a sliding scale. A workflow of a collaborative filtering system may typically include the following steps: 1) a user expresses their preferences by rating items to approximate representation of the user's current interests, 2) the system matches this user's ratings against other users' and finds the users with most "similar" tastes, and 3) with similar users, the system recommends items that the similar users have rated highly but have not yet been rated by the user of interest. The inventor(s) of the present disclosure have identified that a collaboration environment should also take advantage of such technique when it comes to recommending work unit records. In applying the technique, however, the inventor(s) have identified that work unit records are not "rated" in the same or similar matter as other content provision systems that utilize traditional collaborative filtering (e.g., media streaming services). Thus, accomplishing step 1 poses an issue. To address this, the present disclosure proposes adapting a collaborative filtering technique such that the interaction information described herein is used in place of traditional user-reported preferences.

In some implementations, one or more operations of recommendation component 112 may reflect an adapted collaborative filtering approach, which may result in an insight that an individual work unit record that is the subject of the recommendation is "similar" to other records. With similar users, the system 100 generates recommendations for records that the similar users may have interacted with but have not yet been interacted with by the user who is being shown the recommendation (presumably the absence of interaction is often considered as the unfamiliarity of similarity between the yet-to-be-interacted-with records and those they have).

The recommendation component 112 may be configured to determine user similarity. User similarity may be determined based on one or more of interaction information, user records, and/or other information. Determining user similarity may be part of a collaborative filtering technique and/or other techniques. In some implementations, user similarity may be determined based on one or more of interaction information, user records, and/or other information.

The recommendation component 112 may be configured to determine user similarity between the users based on interaction information and/or other information. The recommendation component 112 may be configured to determine user similarity between the users based on interaction value similarity between the interaction values for the users included in the interaction information. In some implementations, interaction value similarity for a set of two or more users with respect to one or more work unit records may lead to a positive determination of user similarity for the users in the set (e.g., the users in the set are "similar"). Conversely, absence of interaction value similarity for a set of two or more users with respect to one or more work unit records may lead to a negative determination of the user similarity for the users in the set (e.g., the users in the set are "not similar"). In some implementations, interaction value similarity may be determined based on one or more of exact similarity in values, values falling within a threshold range, and/or other techniques. Exact similarity between multiple interaction values may mean values are the same. Interaction values falling within a threshold range within one another may allow interaction values that are not exactly the same to be considered similar. The threshold range may include a predetermined quantity of units above and/or below a given interaction value. By way of non-limiting illustration, considering interaction values conveying quantity of visitations to a work unit page, a threshold range may be +/− three visits. A first user may be considered similar to a second user if i) both users visited a given work unit page five times (exact similarity), or ii) the first user visited the given work unit page five times and the second user visited the given work unit page seven times (e.g., five is two less than seven and the threshold range is +/− three).

In some implementations, user similarity based on interaction information may be determined through a nearest neighbor search and/or implementation of a k-nearest neighbors algorithm with respect to the user vectors of interaction values associated with a domain of users.

By way of non-limiting illustration, responsive to the first interaction value being similar to the second interaction value, recommendation component 112 may be configured to determine if the first user and the second user are similar.

The recommendation component 112 may be configured to determine user similarity between the users based on content of user records and/or other information. In some implementations, the content of the user records used to determine user similarity may include values of one or more user parameters. In some implementations, user parameters that provide a basis for determining user similarity may include parameters that characterize one or more of user role, group, department, one or more teams the user belongs to, work unit records the users are members of and/or collaborate on and/or complete, performance/productivity metrics, favorites and/or priorities, and/or other information. By way of non-limiting illustration, users of the same role may be considered similar; users that are members of the same work unit records and/or complete the same work unit records may be similar; users belonging to the same team, department or group may be considered similar; and/or users having the same or similar performance/productivity metrics may be considered similar.

In some implementations, the recommendation component 112 may be configured to determine user similarity based on recommendation context of the individual users. Recommendation context may include the context in which a recommendation is being made. In some implementations, recommendation context may be characterized by user state or status within the collaboration environment at the time of making a recommendation. The user state or status may include one or more of existing user, new user, and/or other state or status.

For an existing user, the determination of user similarity may be performed based on the interaction information and/or content of user records described herein, given that the existing user has participated enough in the collaboration environment to have a robust pool of interaction information and/or content of their user record.

For a new user, the determination of user similarity may be performed differently from that of an existing user, given that the new user may not have interacted with any (or merely a few) records and/or completing defining the content of their user record. Instead, user similarly for new users may be determined based on the manner in which the new users are onboarded and/or otherwise introduced to the collaboration environment. By way of non-limiting illustration, new users are often onboarded together with other users within a common domain of users, such as a business or organization. The domain may already have some work unit records generated within the collaboration environment.

As a new user is onboarded, they may be walked through a process where they can select one or more existing work unit records which are relevant to them and/or their work so that they become members of those records. In some implementations, the act of becoming a member during an onboarding process may take the place of explicit interactions (such as page visitation) and provide an early development of interaction information to then provide the basis to determine user similarity with existing users who may have more explicitly interaction information.

In some implementations, new users are often invited to join the collaboration environment. For example, a new user may be invited to the collaboration environment in the context of joining a team of users within an overarching domain of users (e.g., a new hire is added to a team and is thereafter invited to generate an account in association with the team). In this scenario, the new users may be considered similar to the other existing users who are part of the same team.

In some implementations, generating record recommendations based on the interaction information for similar users may include ranking work unit records based on the interaction information for similar users. By way of non-limiting illustration, recommendation component 112 may be configured to identify the work unit records that the individual users have yet to interact with, but the similar users have. The recommendation component 112 may be configured to rank the work unit records that the individual users have yet to interact with, but the similar users have. In some implementations, the ranking may be based on the interaction information for one or more similar users with respect to the work unit records that the individual users have yet to interact with. Ranking of work unit records may be performed so that work unit records associated with relatively higher interaction values and/or associated with relatively more similar users are ranked higher than other work unit records with relatively lower interaction values and/or associated with relatively fewer similar users.

The recommendation component 112 may be configured to select one or more relatively highest ranked work unit records to be included in the record recommendations for the individual users. The relatively highest ranked work unit records may include one or more of a predetermined quantity (e.g., top 5 ranked records), a relative quantity (e.g., a top half of the ranked work unit records, a top quarter, etc.), and/or other considerations.

By way of non-limiting illustration, recommendation component 112 may be configured to generate, for the first user, a first record recommendation to interact with the second work unit record and/or other work unit records based on the first user being similar to the second user and/or other users, and the first user having yet to interact with the second work unit record and/or the other work unit records. In some implementations, the first record recommendation may be generated further based on the interaction value for the second user corresponding to the second work unit record being the third interaction value (e.g., conveying a certain extent of interactions by the second user).

In some implementations, ranking of work unit records may be based on relative roles of the similar. By way of non-limiting illustration, a work unit record owned by a user's "manager" (or other superior) may be ranked higher than work unit records owned by peers.

In some implementations, ranking of work unit records may be based on recentness of interactions by the similar users with the work unit records, so that work unit records associated with more recent interactions by similar users may be ranked higher than work unit records associated with less recent interactions by the similar users.

In some implementations, ranking of work unit records may be based on a rate-of-join metric for the work unit records, so that so that work unit records associated with a higher historical rate-of-join following record recommendations may be ranked higher than other work unit records. The rate-of-join metric may characterize a rate at which users become members of (or otherwise interact with) individual work unit records following those users being presented record recommendations for those work unit records.

In some implementations, the recommendation component 112 may be configured to determine, for individual users, predicted interaction values for the work unit records the individual users have yet to interact with. The determination may be based on the interaction information for similar users, and/or other information. For example, similar users may share similar interaction values and/or interaction patterns, such that interaction values and/or patterns for one or more similar users may become and/or provide the basis for predicting interaction values for a given user. In some implementations, interaction values for one or more similar users may be aggregated to determine a predicted interaction value for a given user with respect to a work unit record.

By way of non-limiting illustration, the recommendation component 112 may be configured to determine a first predicted interaction value for the first user with respect to the second work unit record. The first predicted interaction value may be determined based on the third interaction value for the second user and/or other interaction values for other similar users that correspond to the second work unit record.

In some implementations, the recommendation component 112 may be configured to generate, for individual users, one or more record recommendations further based on predicted interaction values for the work unit records the individual users have yet to interact with. In some implementations, recommendation component 112 may be configured to rank, for individual users, the work unit records that the individual users have yet to interact with based on the predicted interaction values. The recommendation component 112 may be configured to select one or more relatively highest ranked work unit records to be included in the record recommendations for the individual users.

In some implementations, the model component 114 may be configured to train one or more models to generate one or more trained models that provide the basis for operations performed by the recommendation component 112. By way of non-limiting illustration, a trained model may be provided interaction information and/or other information as input. The trained model may be configured to output one or more of user similarity, predicted interaction values, selecting work unit records to be included in a recommendation, ranking of work unit records, and/or other operations.

In some implementations, a model may comprise one or more of a machine learning model, a probabilistic model, a decision tree model, and/or other models. In some implementations, different models may be utilized at different stages of the system 100.

In some implementations, a machine learning model may utilize one or more of an artificial neural network, naïve Bayes classifier algorithm, k-means clustering algorithm, support vector machine algorithm, linear regression, logistic regression, decision trees, random forest, nearest neighbors, matrix factorization (e.g., a class of a class of collaborative filtering algorithms), and/or other approaches. Training a model may be based on one or more of deep learning, supervised learning, semi-supervised learning, unsupervised learning, reinforcement learning, and/or other techniques.

In supervised learning, the model may be provided with a known training dataset that includes desired inputs and outputs, and the model may be configured to find a method to determine how to arrive at those outputs based on the inputs. By way of non-limiting illustration, in order to output one or more of user similarity, predicted interaction values, selecting work unit records to be included in a recommendation, ranking of work unit records, and/or other operations, a model may be trained with training input information comprising sets of interaction information and/or other information, and training output information comprising labels or classifications of user similarity, predicted interaction values, identification of work unit records to be included in a recommendation, ranking of work unit records, and/or other desired outputs that direct the training of the model. The model may identify patterns in information, learn from observations, and/or make predictions. The model may make predictions and may be corrected by an operator—this process may continue until the model achieves a desired level of accuracy/performance. Supervised learning may utilize approaches including one or more of classification, regression, forecasting, and/or other approaches.

Semi-supervised learning may be similar to supervised learning, but instead uses both labelled and unlabeled data. Labelled data may comprise information that has meaningful tags so that the model can understand the data (e.g., outcome of prior record recommendations that indicate whether a user executed on the recommendation or ignored), while unlabeled data may lack that information. By using this combination, the machine learning model may learn to label unlabeled data.

For unsupervised learning, the machine learning model may study information to identify patterns. There may be no answer key or human operator to provide instruction. Instead, the model may determine the correlations and relationships by analyzing available information (e.g., environment state information, interaction information, and/or other information). In an unsupervised learning process, the machine learning model may be left to interpret large information sets and address that information accordingly. The model may try to organize that information in some way to describe its structure. This might mean grouping the information into clusters or arranging it in a way that looks more organized. Unsupervised learning may use techniques such as clustering and/or dimension reduction.

Reinforcement learning may focus on regimented learning processes, where the machine learning model may be provided with a set of actions, parameters, and/or end values (e.g., the desired outputs). By defining the rules, the machine learning model then tries to explore different options and possibilities, monitoring and evaluating each result to determine which one is optimal to generate correspondences. Reinforcement learning teaches the model trial and error. The model may learn from past experiences and adapt its approach in response to the situation to achieve the best possible result.

The model component 114 may be configured to store a trained model in the non-transitory electronic storage 128 and/or other storage locations.

In some implementations, a model may be trained on information derived from a domain of users. The trained model so trained in this approach may otherwise be referred to as a "base" model from which individual user or group-specific models may be derived. Once a trained model (e.g., "base" model) has been derived from training sets, individual user or group-specific models may be derived. The model component 114 may be configured to generate one or more user or group-specific models. In some implementations, a certain amount of newly interaction information may be required in order to effectively retrain and/or otherwise adapt a base model to a specific user or group of users. In some implementations, adapting the base model may utilize incremental techniques, transfer learning, continual learning, batch-based techniques, and/or other techniques. Those skilled in the art may appreciate other techniques to adapt a base model to fit user or group-specific data that are within the scope of the present disclosure. In some implementations, training data may be partitioned into per-domain datasets, and model component 114 may be configured to parallelize the model training such that a separate model may be produced and applied to each domain.

One or more of models used by system 100 may be continually refined as time goes on. By way of non-limiting illustration, interaction information may be continuously updated as users interact with the collaboration environment, each other, and work unit records, which is then fed back into a model to further refine and/or retrain it. For example, interaction information may be updated based on one or more of user responses to record recommendations (e.g., they either interact with a recommended record or not), users joining or moving to other teams or departments within a domain, users changing roles, new users being added, existing users leaving, and/or other considerations.

In some implementations, a model may be continually refined for specific users and/or groups of users (e.g., teams, users of a given role, etc.). By way of non-limiting illustration, information on a specific user or group of users may be collected and fed back into a trained model to further refine it specifically for that user or group. This may be part of creating the user- or group-specific models from a base model.

The user interface component 110 may be configured to effectuate presentation of instances of a user interface of the collaboration environment on client computing platform(s) 104 of the user. The user interface may provide one or more views of the collaboration environment and/or provide other features and/or functionality. The one or more views may include one or more pages of the collaboration environment, individual recommendations, and/or other content. In some implementations, an individual view of the collaboration environment may textually and/or graphically display information from one or more of a user record, a work unit record, and/or other information. By way of non-limiting illustration, a view may display one or more of a work unit page, a queue of units of work, one or more recommendations, and/or other information.

In some implementations, user interface component 110 may be configured to effectuate presentation of instances of a user interface of the collaboration environment including recommendations identifying one or more of the work unit records that the individual ones of the users should interact with. Effectuating presentation of a user interface may include one or more of generating user interface information defining the user interface, communicating the user interface information to client computing platform(s) 104 over network(s) 116, and/or other operations. Individual client computing platform(s) 104 may receive the user interface information. The user interface information may cause the client computing platform(s) 104 to present instances of the user interface.

A recommendation may be presented as one or more of a user interface window, pop-up, user interface portion, and/or other display configured to present textual information, graphic elements, user interface elements, and/or other elements. By way of non-limiting illustration, the first record recommendation may be presented on a first computing platform associated with the first user.

The user interface may include one or more user interface portions. The user interface may include one or more user interface elements configured to facilitate user interaction with the user interface. By way of non-limiting illustration, user interface elements may include one or more of text input fields, drop-down menus, check boxes, display windows, virtual buttons, icons, graphics, and/or other elements configured to facilitate user interaction.

The user interface may be configured to receive user input comprising entry into the user interface and/or selection of individual recommendations and/or elements displayed in the recommendations. The users may provide entry and/or selection into the user interface conveying acceptance of individual recommendations. In response to obtaining entry and/or selection into the user interface conveying acceptance of individual recommendations, one or more actions may be carried out. In some implementations, the actions may include one or more of the accepting-users being added as members of the work unit record(s) identified in the recommendation(s), the user interface navigating to individual pages of the work unit record(s) identified in the recommendation(s), one or more automated communications being added to individual pages of the work unit record(s) identified in the recommendation(s), and/or other actions.

The user interface component 110 may be configured to obtain and/or generate user input information conveying the entry and/or selection within the user interface of individual ones of the recommendations at the client computing platform(s) 104. The user input information may be stored in non-transitory electronic storage 128 and/or other storage locations. In some implementations, interactions at the client computing platforms 104 comprising the entry and/or selection of the recommendations may be communicated to user interface component 110 such that user interface component 110 may generate the user input information. In some implementations, individual client computing platforms may generate the user input information based on the user entry and/or selection and communicate the user input information to the user interface component 110.

The user interface component 110 may be configured to perform one or more actions in response to entry and/or selection within the user interface of the individual ones of the recommendations. By way of non-limiting illustration, the user interface component 110 may be configured to, responsive to entry and/or selection within the user interface, perform one or more of: effectuate presentation of individual work unit pages for individual ones of the work unit records identified in selected ones of the recommendations; cause the individual ones of the work unit records identified in the selected ones of the recommendations to identify the individual ones of the users performing the selection (e.g., the selecting user becomes a member); and/or other operations.

In some implementations, identifying the individual ones of the users performing the selection may include linking user records of the individual ones of the users to the individual ones of the work unit records.

In some implementations, effectuating presentation of individual work unit pages for individual ones of the work unit records identified in selected ones of the recommendations may include presenting a new user interface, user interface portion, pop-up window, or the like for a work unit page. This way, a user may further view a work unit page for a recommended work unit record, communicate with other users (e.g., members) of the recommended work unit record, and/or perform other actions to determine whether they want to accept the recommendation and become a member. In some implementations, effectuating presentation of individual work unit pages may be facilitated through a dedicated user interface element (e.g., virtual button) that may be separate from a dedicated user interface element (e.g., virtual button) for accepting a recommendation.

In some implementations, recommendation component 112 may be configured to learn user preferences based on acceptance and/or dismissal of recommendations. By way of non-limiting illustration, in response to acceptance of a recommended work unit record by a user, recommendation component 112 may be configured to determine that the user prefers work unit records having the type of work or content (e.g., assignee, assignor, member, owner, manager, etc.) of the recommended work unit record, which may impact current and/or future determinations. For example, work unit records of the same or similar type of work or content as the recommended work unit record may be moved higher on a ranking and/or recommended more often. By way of non-limiting illustration, in response to dismissal of a recommended work unit record by a user, recommendation component 112 may be configured to determine that the user does not prefer work unit records of the type or content of the recommended work unit record, which may impact current and/or future rankings and/or recommendations. For example, work unit records of the same or similar type of work or content as the recommended work unit record may be moved lower on a ranking and/or may not be recommended.

Figure 3:
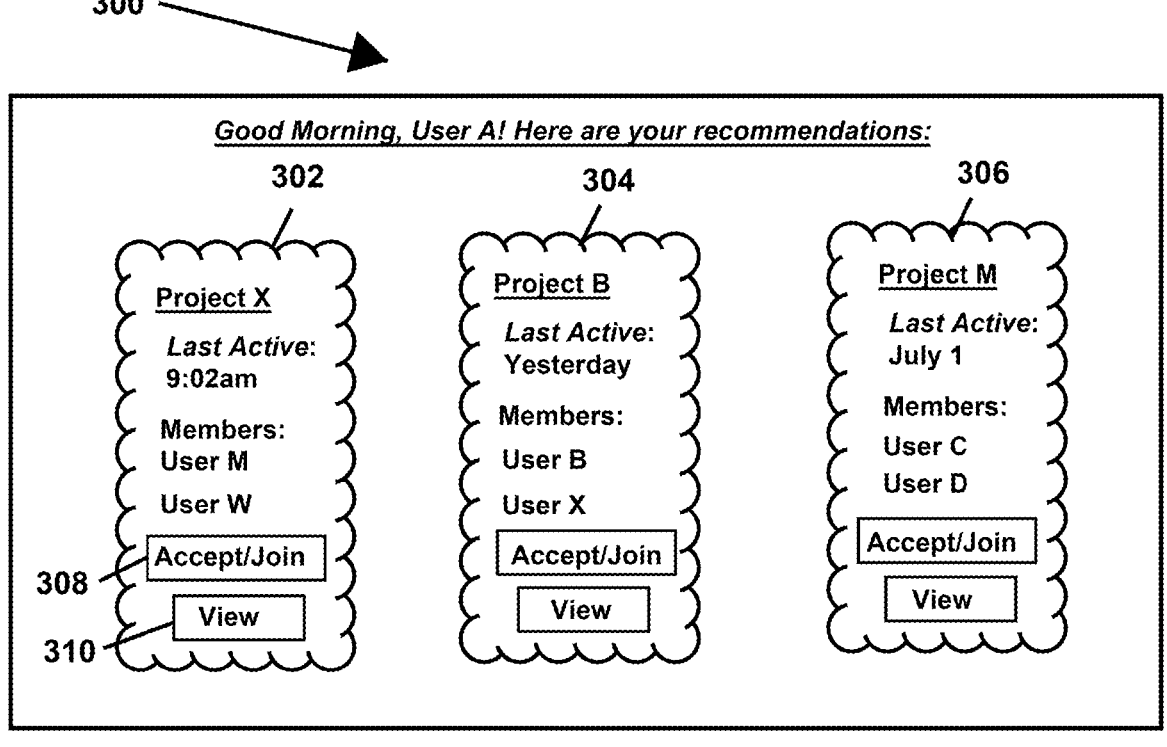
FIG. 3 illustrates a user interface, in accordance with one or more implementations.

FIG. 3 illustrates a user interface 300 of a collaboration environment, in accordance with one or more implementations. The user interface 300 may include a view of a collaboration environment. In particular, the user interface 300 may display a recommendation identifying a set of work unit records that a given user (e.g., User A) should become members of. The user interface 300 may be presented in response to one or more of determining interaction information for the user, ranking work unit records that the individual users have yet to interact with but the similar users have, generating the record recommendation based on the interaction information, ranking, and/or other information, and/or other operations. By way of non-limiting illustration, the user interface 300 may include one or more of a first portion 302 identifying a first work unit record (e.g., Project X) that the user should interact with, a second portion 304 identifying a second work unit record (e.g., Project B) that the user should interact with, a third portion 306 identifying a third work unit record (e.g., Project M) that the user should interact with, and/or other portions identifying other work unit records. Sets of user interface elements may be included which allow the user to accept a recommendation and/or view a page for a recommended work unit record. By way of non-limiting illustration, first portion 302 may include one or more of a first user interface element 308 (e.g., virtual button) to cause the user to become a member of the first work unit record, a second user interface element 310 (e.g., virtual button) to cause presentation of a work unit page for the first work unit record, and/or other elements. Other portions of the user interface 300 identifying other work unit records may be similarly configured.

Figure 4:
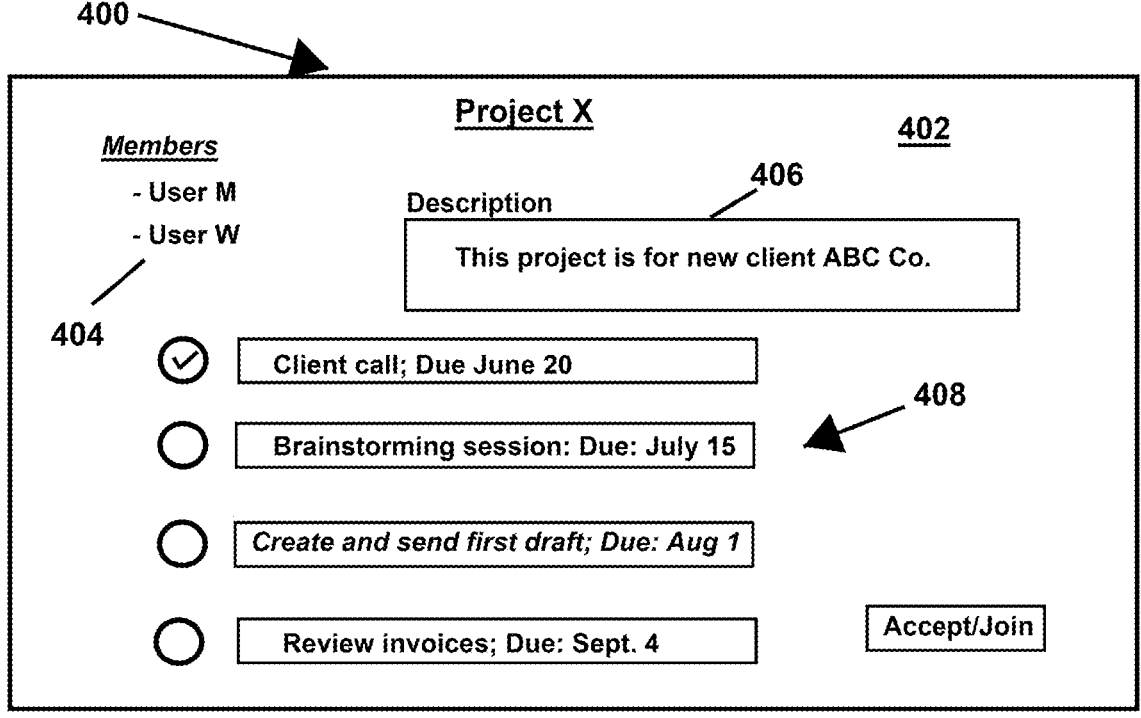
FIG. 4 illustrates a user interface, in accordance with one or more implementations.

FIG. 4 illustrates a user interface 400 of a collaboration environment, in accordance with one or more implementations. The user interface 400 may include a view of a collaboration environment. In particular, the user interface 400 may comprise a work unit page 402 for the first work unit record (e.g., Project X) identified in FIG. 3. The user interface 400 may be presented in response to selection of user interface element 310 of FIG. 3. The user interface 400 may display and/or provide access to values of one or more parameters of the first work unit record. By way of non-limiting illustration, user interface 400 may include one or more of a user interface element 404 displaying a list of members of the first work unit record, user interface element 406 displaying a description of the first work unit record, user interface element 408 displaying a list of other work unit records that support the first work unit records (e.g., tasks that support fulfillment of Project X), and/or other content. In some implementations, a user interface element (e.g., virtual button) may also be included in the work unit page 402 to cause the user to become a member of the first work unit record upon selection.

FIGS. 3 and 4 are provided for illustrative purposes only and are not to be considered limiting. Instead, those skilled in the art may appreciate other configurations and/or displays within user interfaces that may be provided in order to achieve the features and/or functionally described herein.

Referring back to FIG. 1, in some implementations, server(s) 102, client computing platform(s) 104, and/or external resources 126 may be operatively linked via one or more electronic communication links. For example, such electronic communication links may be established, at least in part, via network(s) 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with network(s) 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or other components. Processor(s) 130 may be configured to execute components 108, 110, 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
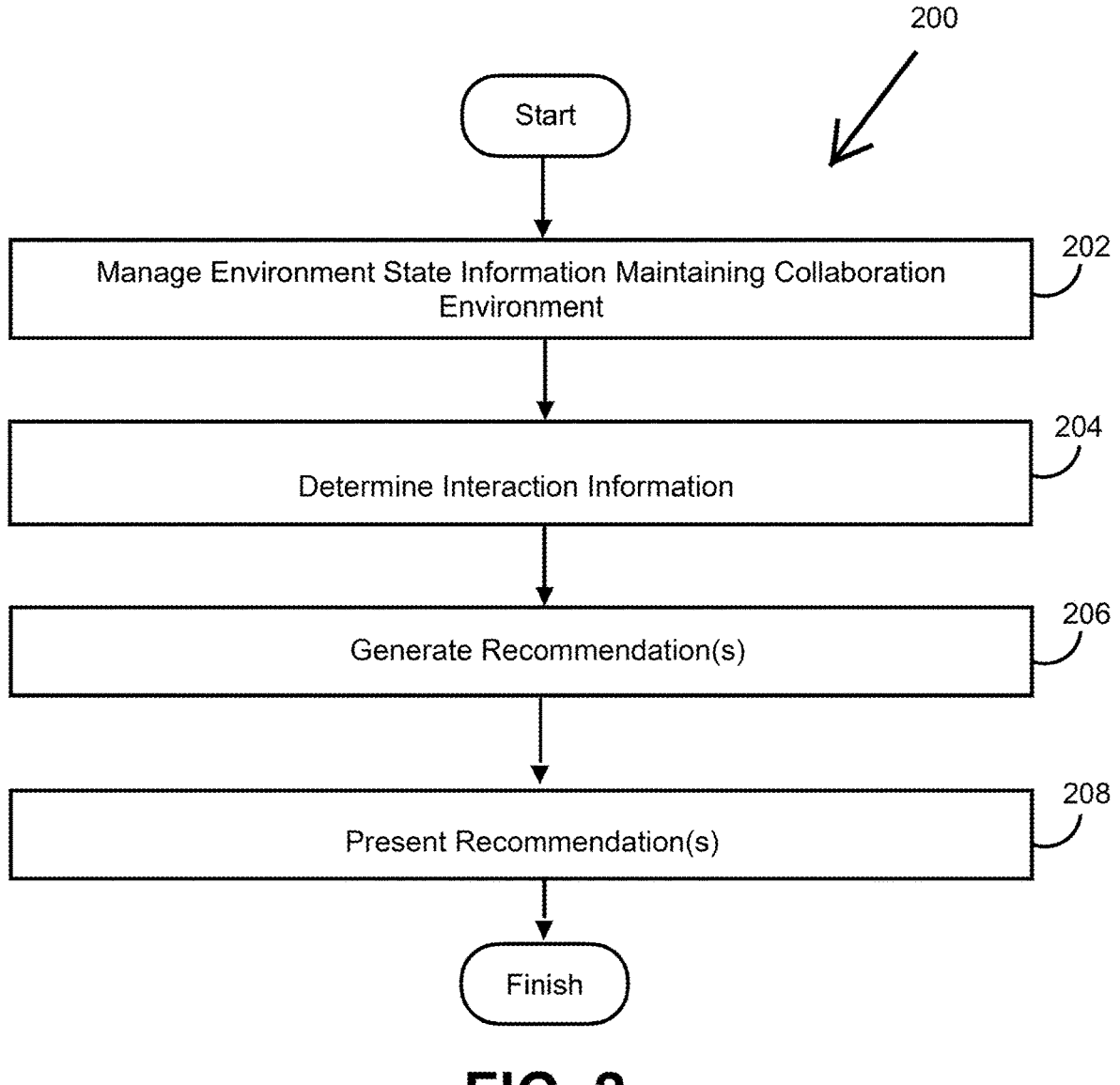
FIG. 2 illustrates a method to generate record recommendations for users of collaboration environment, in accordance with one or more implementations.

FIG. 2 illustrates a method 200 to generate record recommendations for users of collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may include work unit records and/or other records. The work unit records may describe units of work managed, created, and/or assigned within the collaboration environment. Operation 202 may be performed by one or more hardware processors configured by machine-readable instructions including a component that is the same as or similar to environment state component 108 (shown in FIG. 1 and described herein), in accordance with one or more implementations.

An operation 204 may determine interaction information for the users. The interaction information may include interaction values for an interaction attribute and/or other information. The interaction attribute may characterize interactions of individual ones of the users with individual ones of the work unit records. An individual interaction value may correspond to an individual one of the work unit records and an individual one of the users. By way of non-limiting illustration, the interaction information may include one or more of a first interaction value for a first user corresponding to a first work unit record, a second interaction value for a second user corresponding to the first work unit record, a third interaction value for the second user corresponding to a second work unit record, and/or other information. Operation 204 may be performed by one or more hardware processors configured by machine-readable instructions including a component that is the same as or similar to environment state component 108 (shown in FIG. 1 and described herein), in accordance with one or more implementations.

An operation 206 may generate, for the individual users, record recommendations. The record recommendations may be generated based on the interaction information for similar users, and/or other information. An individual record recommendation may include a recommendation for an individual user to interact with the individual work unit record that the individual user has yet to interact with but one or more similar users have. By way of non-limiting illustration, for the first user, operation 206 may generate a first record recommendation to interact with the second work unit record based on the first user being similar to the second user and the first user having yet to interact with the second work unit record. Operation 206 may be performed by one or more hardware processors configured by machine-readable instructions including a component that is the same as or similar to recommendation component 112 (shown in FIG. 1 and described herein), in accordance with one or more implementations.

An operation 208 may effectuate presentation of the record recommendations on computing platforms associated with the individual ones of the users. By way of non-limiting illustration, the first recommendation may be presented on a first computing platform associated with the first user. Operation 208 may be performed by one or more hardware processors configured by machine-readable instructions including a component that is the same as or similar to user interface component 110 (shown in FIG. 1 and described herein), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to generate record recommendations for users of a collaboration environment, the system comprising:

non-transitory electronic storage storing environment state information maintaining a collaboration environment, the environment state information including work unit records, the work unit records describing units of work managed, created, and/or assigned within the collaboration environment; and one or more physical processors configured by machine-readable instructions to:

manage the environment state information to facilitate interaction by users with the collaboration environment through instances of a graphical user interface;

establish one or more network connections with client computing platforms associated with the users;

effectuate communication of user interface information to the client computing platforms over the one or more network connections to cause the client computing platforms to present the instances of the graphical user interface through which the users interact with the work unit records;

generate interaction information for the users based on monitoring change in the environment state information over time derived from interactions by the users with the collaboration environment via the instances of the graphical user interface, the interaction information including interaction values for an interaction attribute that characterizes the interactions of individual ones of the users with individual ones of the work unit records in individual ones of the instances of the graphical user interface, an individual interaction value corresponding to an individual one of the work unit records and an individual one of the users, the interaction information including a first interaction value for a first user corresponding to a first work unit record, a second interaction value for a second user corresponding to the first work unit record, and a third interaction value for the second user corresponding to a second work unit record;

for individual users:

rank the work unit records that the individual users have yet to interact with, but similar users have, based on the interaction information for the similar users; and select one or more relatively highest ranked work unit records to be included in record recommendations for the individual users;

generate, for the individual users, the record recommendations based on the one or more relatively highest ranked work unit records, an individual record recommendation including a recommendation for an individual user to interact with an individual relatively highest ranked work unit record that the individual user has yet to interact with but a similar user has, such that for the first user, generate a first record recommendation to interact with the second work unit record based on the first user being similar to the second user and the first user having yet to interact with the second work unit record and the second work unit record being relatively highest ranked for the first user; and update the user interface information to cause the instances of the graphical user interface to present the record recommendations, and wherein selection of individual ones of the record recommendations causes the instances of the graphical user interface to navigate to individual work unit pages corresponding to the individual ones of the record recommendations.

2. The system of claim 1, wherein the one or more physical processors are further configured by the machine-readable instructions to:

determine, for the individual users, predicted interaction values for the work unit records the individual users have yet to interact with based on the interaction information for the similar users, including determine a first predicted interaction value for the first user with respect to the second work unit record based on the third interaction value for the second user with respect to the second work unit record.

3. The system of claim 2, wherein the one or more physical processors are further configured by the machine-readable instructions to:

generate, for the individual users, the record recommendations further based on the predicted interaction values for the work unit records the individual users have yet to interact with.

4. The system of claim 3, wherein the one or more physical processors are further configured by the machine-readable instructions to:

for the individual users:

rank the work unit records that the individual users have yet to interact with further based on the predicted interaction values.

5. The system of claim 1, wherein the interactions are classified by interaction types, the interaction types include visitation type, sharing type, collaboration type, and multi-homing type.

6. The system of claim 5, wherein:

the interaction values of the visitation type convey quantity of visitations to work unit pages of the work unit records by the users;

the interaction values of the sharing type convey quantity of sharing instances of the work unit pages of the work unit records by the users;

the interaction values of the collaboration type convey quantity of comments within the work unit pages of the work unit records by the users; and the interaction values of the multi-homing type convey quantity of comments within the work unit pages of the work unit records by the users.

7. The system of claim 5, wherein individual interaction values are generated by aggregating sets of interaction values determined per work unit record per interaction type.

8. The system of claim 7, wherein aggregating includes weighting the individual interaction values in the sets of interaction values determined per work unit record based on the interaction types of the interactions with the work unit records.

9. The system of claim 1, wherein the one or more physical processors are further configured by the machine-readable instructions to:

determine, for the individual users, recommendation context conveying user states with respect to interaction with the collaboration environment; and determine user similarity based on the recommendation context of the individual users.

10. A method to generate record recommendations for users of a collaboration environment, the method being implemented in a computer system comprising non-transitory electronic storage and one or more physical processors configured by machine-readable instructions, the method comprising:

managing, by the one or more physical processors, environment state information stored in the non-transitory electronic storage, the environment state information maintaining a collaboration environment, the collaboration environment being configured to facilitate interaction by users with the collaboration environment through instances of a graphical user interface, the environment state information including work unit records, the work unit records describing units of work managed, created, and/or assigned within the collaboration environment;

establishing one or more network connections with client computing platforms associated with the users;

effectuating communication of user interface information from the one or more physical processors to the client computing platforms over the one or more network connections to cause the client computing platforms to present the instances of the graphical user interface through which the users interact with the work unit records;

generating interaction information for the users based on monitoring change in the environment state information over time derived from interactions by the users with the collaboration environment via the instances of the graphical user interface, the interaction information including interaction values for an interaction attribute that characterizes the interactions of individual ones of the users with individual ones of the work unit records in individual ones of the instances of the graphical user interface, an individual interaction value corresponding to an individual one of the work unit records and an individual one of the users, the interaction information including a first interaction value for a first user corresponding to a first work unit record, a second interaction value for a second user corresponding to the first work unit record, and a third interaction value for the second user corresponding to a second work unit record;

for individual users:

ranking the work unit records that the individual users have yet to interact with, but similar users have, based on the interaction information for the similar users; and selecting one or more relatively highest ranked work unit records to be included in record recommendations for the individual users;

generating, for the individual users, the record recommendations based on the one or more relatively highest ranked work unit records, an individual record recommendation including a recommendation for an individual user to interact with an individual relatively highest ranked work unit record that the individual user has yet to interact with but a similar user has, including generating, for the first user, a first record recommendation to interact with the second work unit record based on the first user being similar to the second user and the first user having yet to interact with the second work unit record and the second work unit record being relatively highest ranked for the first user; and updating the user interface information to cause the instances of the graphical user interface to present the record recommendations, and wherein selection of individual ones of the record recommendations causes the instances of the graphical user interface to navigate to individual work unit pages corresponding to the individual ones of the record recommendations.

11. The method of claim 10, further comprising:

determining, for the individual users, predicted interaction values for the work unit records the individual users have yet to interact with based on the interaction information for the similar users, including determining a first predicted interaction value for the first user with respect to the second work unit record based on the third interaction value for the second user with respect to the second work unit record.

12. The method of claim 11, further comprising:

generating, for the individual users, the record recommendations further based on the predicted interaction values for the work unit records the individual users have yet to interact with.

13. The method of claim 12, further comprising:

for the individual users:

performing the ranking of the work unit records that the individual users have yet to interact with further based on the predicted interaction values.

14. The method of claim 10, wherein the interactions are classified by interaction types, the interaction types include visitation type, sharing type, collaboration type, and multi-homing type.

15. The method of claim 14, wherein:

the interaction values of the visitation type convey quantity of visitations to work unit pages of the work unit records by the users;

the interaction values of the sharing type convey quantity of sharing instances of the work unit pages of the work unit records by the users;

the interaction values of the collaboration type convey quantity of comments within the work unit pages of the work unit records by the users; and the interaction values of the multi-homing type convey quantity of comments within the work unit pages of the work unit records by the users.

16. The method of claim 14, wherein individual interaction values are generated by aggregating sets of interaction values determined per work unit record per interaction type.

17. The method of claim 16, wherein the aggregating includes weighting the individual interaction values in the sets of interaction values determined per work unit record based on the interaction types of the interactions with the work unit records.

18. The method of claim 10, further comprising:

determining, for the individual users, recommendation context conveying user states with respect to interaction with the collaboration environment; and determining user similarity based on the recommendation context of the individual users.

* * * * *